(12) United States Patent
Vijayaraghavan et al.

(10) Patent No.: US 12,717,593 B2
(45) Date of Patent: Aug. 25, 2026

(54) CIRCUITS AND METHODS FOR EXCHANGING DATA COHERENCY TRAFFIC THROUGH MULTIPLE INTERFACES

(71) Applicant: Altera Corporation, San Jose, CA (US)

(72) Inventors: Divya Vijayaraghavan, Los Altos, CA (US); Joshua Schabel, Apex, NC (US)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 19/000,169

(22) Filed: Dec. 23, 2024

(65) Prior Publication Data

US 2025/0130943 A1 Apr. 24, 2025

(51) Int. Cl.
*G06F 9/448* (2018.01)
*G06F 15/78* (2006.01)

(52) U.S. Cl.
CPC ............ *G06F 9/4498* (2018.02); *G06F 15/78* (2013.01)

(58) Field of Classification Search
CPC ......... H04L 49/90; G06F 15/78; G06F 13/16; G06F 12/0831; G06F 12/0815; G06F 12/0806; G06F 9/4498; G06F 8/20
See application file for complete search history.

(56) References Cited

U.S. PATENT DOCUMENTS 6,636,949 B2 * 10/2003 Barroso .............. G06F 12/0826 709/213
7,600,078 B1 10/2009 Cen et al.
8,392,590 B2 * 3/2013 Bouchard .............. H04L 63/04 709/230
2014/0036681 A1 * 2/2014 Kamerkar ........... H04L 43/0888 370/235

* cited by examiner

*Primary Examiner* — Daniel D Chang
(74) *Attorney, Agent, or Firm* — InventIQ Legal LLP; Steven J. Cahill

(57) ABSTRACT

An integrated circuit includes a device coherency circuit, first and second traffic generator processor circuits, first and second interfaces, and a processor control finite state machine circuit that causes the first traffic generator processor circuit to perform first coherency data validation for first data sets and that causes the second traffic generator processor circuit to perform second coherency data validation for second data sets. The first traffic generator processor circuit transmits first traffic for the first data sets to the device coherency circuit through the first interface. The second traffic generator processor circuit transmits second traffic for the second data sets to the device coherency circuit through the second interface.

20 Claims, 6 Drawing Sheets

CIRCUITS AND METHODS FOR EXCHANGING DATA COHERENCY TRAFFIC THROUGH MULTIPLE INTERFACES

BACKGROUND

Configurable integrated circuits (ICs) can be configured by users to implement desired custom logic functions. In a typical scenario, a logic designer uses computer-aided design (CAD) tools to design a custom circuit design. When the design process is complete, the computer-aided design tools generate an image containing configuration data bits. The configuration data bits are then loaded into configuration memory elements that configure configurable logic circuits in the integrated circuit to perform the functions of the custom circuit design.

DETAILED DESCRIPTION

Figure 1:
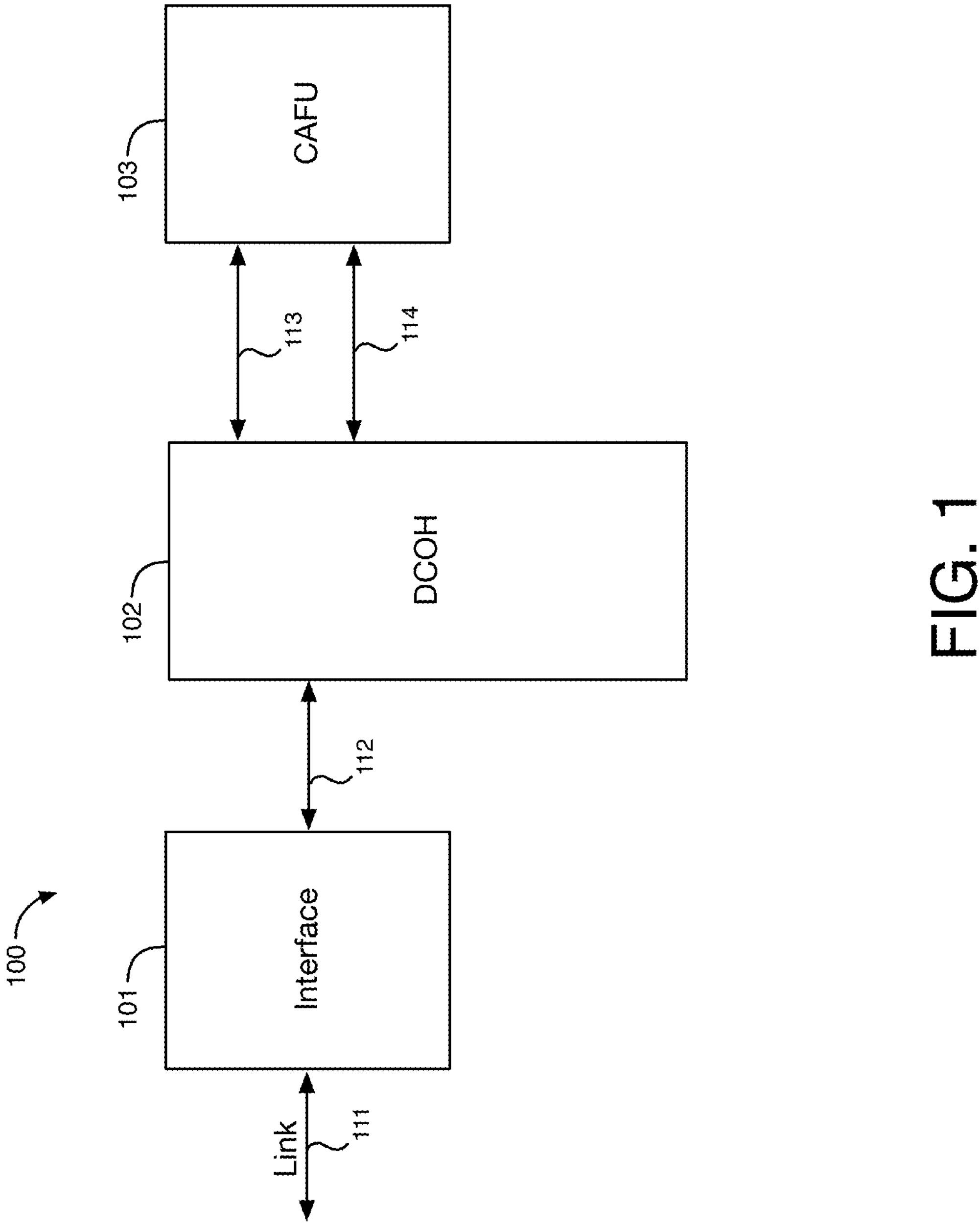
FIG. 1 is a diagram that illustrates an example of a dual issue coherent computational memory bandwidth expander circuit.

Compute Express Link (CXL) is an open standard interconnect for high-speed, high capacity central processing unit (CPU)-to-device and CPU-to-memory connections that is designed for high performance data center computers. The CXL ecosystem includes Active Memory Tiering and Computational Memory as two prominent use cases. In the Active Memory Tiering use case, local and remote memory tiers address the challenge of limited server memory capacity and migration of hot and cold pages between tiers that dramatically improves storage and network efficiencies.

Remote memory tiers are enhanced to accelerate or process data in close proximity to the memory elements in Computational Memory use cases. Computational Memory use cases require bandwidth saturation of the Type 2 CXL cache data-path in order to efficiently accelerate functions for artificial intelligence (AI) applications, such as data traversing through multiple convolution layers and data compression.

According to some examples disclosed herein, a dual issue coherent computational memory bandwidth expander enables a coherent acceleration functional unit (CAFU) that implements functions being offloaded from a central processing unit (CPU) and accelerated on an accelerator (such as a configurable integrated circuit) to dual issue traffic to a device coherency agent (DCOH). The dual issue coherent computational memory bandwidth expander enables processing bandwidths that are mandatory to accelerate AI workloads and other computationally intensive memory use applications. The dual issue coherent computational memory bandwidth expander doubles bandwidth, while maintaining memory coherency rules. The dual issue coherent computational memory bandwidth expander utilizes a processor control finite state machine (FSM) that resides within the CAFU to control the issuing of data sets to the DCOH across two or more interfaces between the DCOH and the CAFU. Using two or more interfaces allows the bandwidth through the DCOH to be increased by allowing all of the interfaces to be fully utilized, while adhering to coherency qualification rules.

One or more specific examples are described below. In an effort to provide a concise description of these examples, not all features of an actual implementation are described herein. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Throughout the specification, and in the claims, the terms "connected" and "connection" mean a direct electrical connection between the circuits that are connected, without any intermediary devices. The terms "coupled" and "coupling" mean either a direct electrical connection between circuits or an indirect electrical connection through one or more passive or active intermediary devices that allows the transfer of information (e.g., voltage or current) between circuits. The term "circuit" may mean one or more passive and/or active electrical components that are arranged to cooperate with one another to provide a desired function.

This disclosure discusses integrated circuit devices, including configurable (programmable) logic integrated circuits, such as field programmable gate arrays (FPGAs) and programmable logic devices. As discussed herein, an integrated circuit (IC) can include hard logic and/or soft logic. The circuits in an integrated circuit device (e.g., in a configurable logic IC) that are configurable by an end user are referred to as "soft logic." "Hard logic" generally refers to circuits in an integrated circuit device that have substantially fewer configurable features than soft logic or no configurable features.

Figure (FIG. 1 is a diagram that illustrates an example of a dual issue coherent computational memory bandwidth expander circuit 100 in an IC. The dual issue coherent computational memory bandwidth expander circuit 100 includes an interface 101, a device coherency agent (DCOH) circuit 102, a coherent acceleration functional unit (CAFU) circuit 103, an external link 111, and internal busses 112, 113, and 114. The dual issue coherent computational memory bandwidth expander circuit 100 can be formed in any type of integrated circuit (IC), such as a configurable logic IC (e.g., a field programmable gate array (FPGA) or programmable logic device), a microprocessor IC, a graphics processing unit IC, a transceiver IC, a memory IC, an application specific integrated circuit (ASIC), or a structured ASIC.

The dual issue coherent computational memory bandwidth expander circuit 100 can, for example, be part of circuitry within the IC that is used to perform acceleration functions for a host central processing unit (CPU). The computational memory bandwidth expander circuit 100 can exchange traffic with the host CPU, external memory devices, and other external devices through the link 111 for the acceleration functions and/or other functions performed within the IC. The dual issue coherent computational memory bandwidth expander circuit 100 includes two interfaces for transmitting traffic between the DCOH circuit 102 and the CAFU circuit 103. These two interfaces are described in further detail below.

Figure 2:
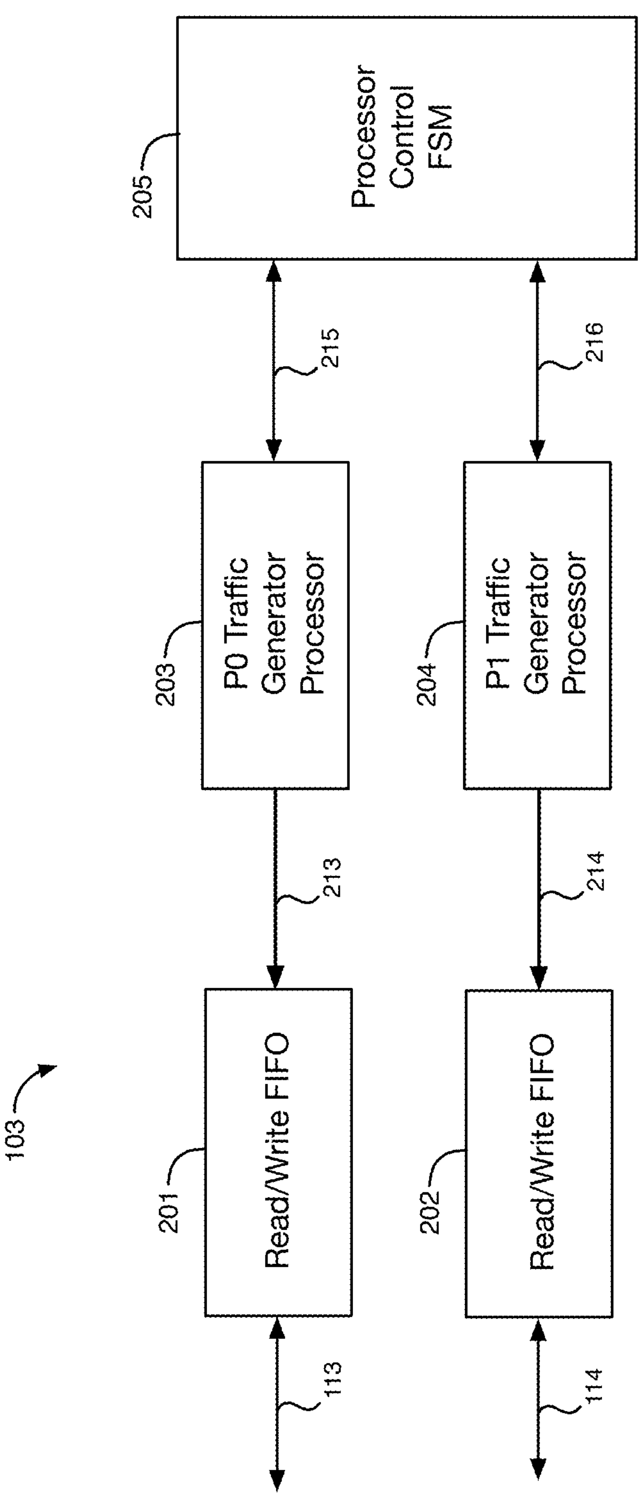
FIG. 2 is a diagram that illustrates further details of examples of circuits that can be in the coherent acceleration functional unit (CAFU) circuit of FIG. 1.

FIG. 2 is a diagram that illustrates further details of examples of circuits that can be in the coherent acceleration functional unit (CAFU) circuit 103 of FIG. 1. In the example of FIG. 2, the CAFU circuit 103 includes read/write first-in-first-out (FIFO) circuits 201 and 202, P0 traffic generator processor circuit 203 (also referred to herein as processor P0), P1 traffic generator processor circuit 204 (also referred to herein as processor P1), processor control finite state machine (FSM) circuit 205, and busses 213, 214, 215, and 216. FIG. 2 also shows busses 113-114. The first interface that is used for transmitting traffic between the DCOH circuit 102 and the CAFU circuit 103 includes busses 113 and 213 and read/write FIFO circuit 201. The second interface that is used for transmitting traffic between the DCOH circuit 102 and the CAFU circuit 103 includes buses 114 and 214 and read/write FIFO circuit 202. The first and second interfaces can, for example, conform to the Advanced Extensible Interface (AXI) standard.

P0 traffic generator processor circuit 203 performs coherency data validation and generates data coherency traffic (e.g., AXI read and write requests) that is transmitted through the first interface to DCOH 102. P1 traffic generator processor circuit 204 performs coherency data validation and generates data coherency traffic (e.g., AXI read and write requests) that is transmitted through the second interface to DCOH 102. The DCOH circuit 102 performs cache coherency testing using caches that store data. DCOH circuit 102 transmits the traffic received from the CAFU 103 through bus 112, interface 101, and link 111 to the host CPU and/or to other external devices. The processor control FSM circuit 205 controls the operation of the P0 traffic generator processor circuit 203 by generating control signals that are transmitted through bus 215. The processor control FSM circuit 205 controls the operation of the P1 traffic generator processor circuit 204 by generating control signals that are transmitted through bus 216.

Figure 3:
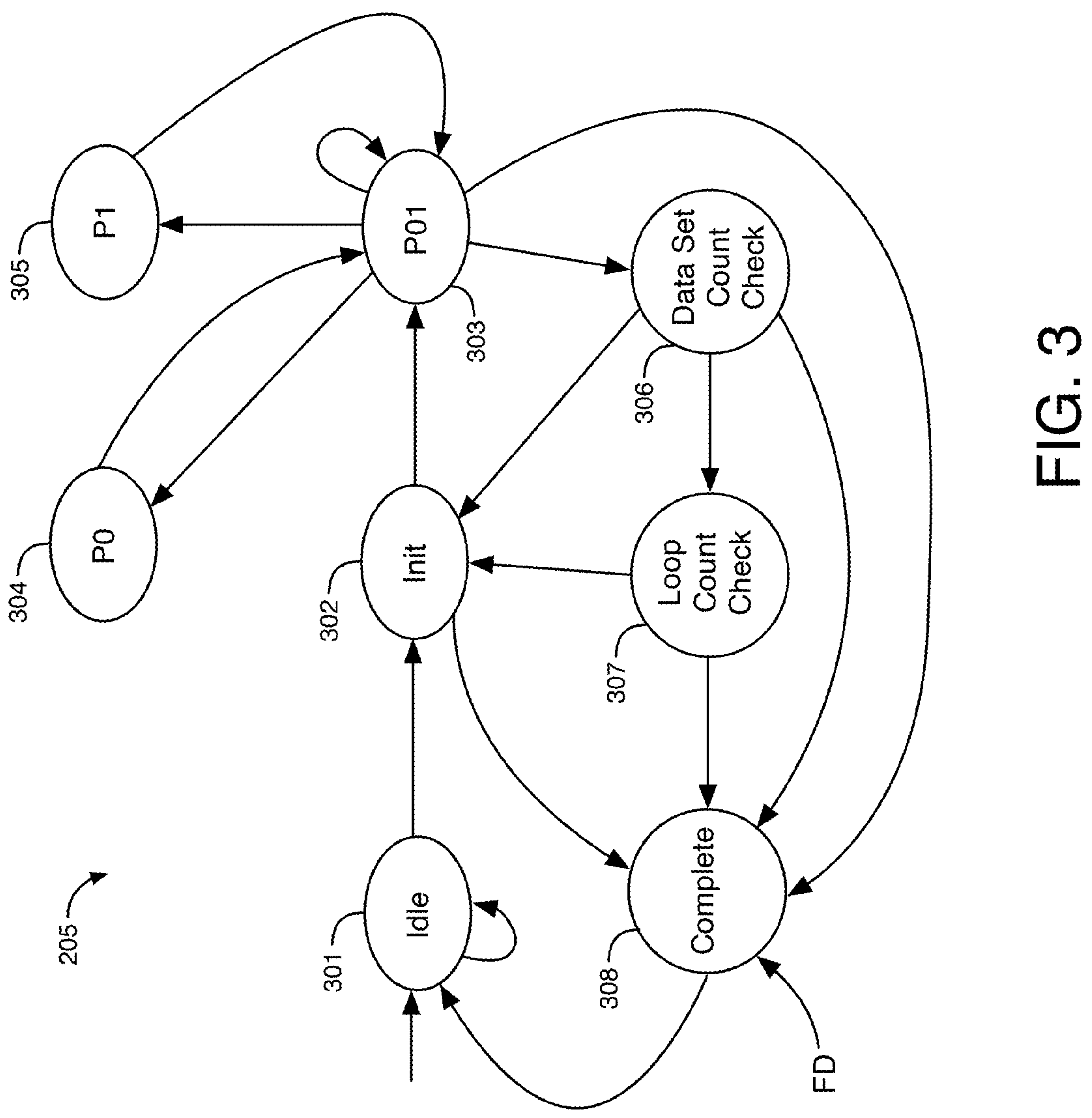
FIG. 3 is a state diagram that illustrates examples of the states of the processor control finite state machine (FSM) circuit of FIG. 2 and the transitions between the states.

FIG. 3 is a diagram that illustrates examples of the states of the processor control finite state machine (FSM) circuit 205 of FIG. 2 and the transitions between the states. FIG. 3 illustrates 8 states of the processor control FSM circuit 205 (also referred to herein as FSM circuit 205) including an idle state 301, an initialization (Init) state 302, a P01 state 303, a P0 state 304, a P1 state 305, a data set count check state 306, a loop count check state 307, and complete state 308. The arrows in FIG. 3 illustrate the transitions that the FSM circuit 205 can make between the states 301-308 using an FSM algorithm.

When the FSM algorithm is disabled, the processor control FSM circuit 205 remains in the idle state 301. When the FSM algorithm is enabled (e.g., by setting a control register), the FSM circuit 205 transitions to the initialization state 302. If a graceful disable (GD) function is not set, and both of the P0 and P1 processor circuits 203-204 are initially not busy, the FSM circuit 205 transitions to P01 state 303 to cause processors 203-204 (P0-P1) to process data sets. In state 303, FSM circuit 205 sends control signals to processors 203-204 (P0-P1) through busses 215 and 216 to cause the processors 203-204 (P0-P1) to perform coherency data validation for the data sets and generate data coherency traffic (e.g., including AXI read and write requests) for the data sets that is transmitted through the first and second interfaces, respectively, to DCOH circuit 102. The FSM circuit 205 assigns the data sets to the processors 203-204 for processing the data sets and generating the data coherency traffic. Each of the processors 203-204 indicates to the FSM circuit 205 through the respective bus 215-216 when that processor is finished processing each data set.

The FSM circuit 205 transitions to state P0 304 to cause processor 203 P0 to process data sets and to prevent processor 204 P1 from processing data sets. In state 304, FSM circuit 205 sends control signals to processor 203 P0 through bus 215 to cause the processor 203 P0 to continue to perform coherency data validation for data sets and to generate data coherency traffic (e.g., including AXI read and write requests) for the data sets that is transmitted through the first interface to DCOH circuit 102 and then to the host or other external device. In states 303 and 304, processor 203 P0 also processes incoming data traffic (e.g., AXI read and write responses) received from an external device through DCOH circuit 102 and the first interface.

The FSM circuit 205 transitions to state P1 305 to cause processor 204 P1 to process data sets and to prevent processor 203 P0 from processing data sets. In state 305, FSM circuit 205 sends control signals to processor 204 P1 through bus 216 to cause the processor 204 P1 to continue to perform coherency data validation for data sets and to generate data coherency traffic (e.g., including AXI read and write requests) for the data sets that is transmitted through the second interface to DCOH circuit 102 and then to the host or other external device. In states 303 and 305, processor 204 P1 also processes incoming data traffic (e.g., AXI read and write responses) received from an external device through DCOH circuit 102 and the first interface.

If the CAFU circuit 103 has a large number of data sets to process within a large number of loops, the FSM circuit 205 can asynchronously enable the processors 203-204 (P0-P1) to process different data sets within different loops. The FSM circuit 205 allows the two processors 203-204 (P0-P1) to process data sets asynchronously, which substantially increases the data bandwidth of the CAFU circuit 103. In addition, the processors 203-204 (P0-P1) can finish processing the data sets asynchronously based on how quickly responses are received back from the DCOH circuit 102. If one of the processors 203 or 204 (P0/P1) finishes processing a data set faster than the other processor P0/P1, then the faster processor P0/P1 can start processing the next data set, while the slower processor P0/P1 continues to process the current data set. The processors 203-204 (P0-P1) asynchronously transmit the data coherency traffic for the data sets through the first and second interfaces, respectively, to the DCOH circuit 102. DCOH circuit 102 sends the data coherency traffic through bus 112, interface 101, and link 111 to the host CPU or other devices.

When both of the processors 203-204 (P0-P1) are busy processing data sets, FSM circuit 205 remains in state 303. When both of the processors 203-204 (P0-P1) are not busy processing data, the FSM circuit 205 performs a data set count check in state 306. In state 306, the FSM circuit 205 compares the number of data sets that the processors 203-204 (P0-P1) have processed (i.e., performing coherency data validation) to a maximum set count threshold for the current loop. If the number of data sets that the processors 203-204 (P0-P1) have processed does not exceed the maximum set count threshold, then the FSM circuit 205 returns to initialization state 302 and then back to state P01 303 to continue processing data sets in the current loop.

If the number of data sets that the processors 203-204 (P0-P1) have processed exceeds the maximum set count threshold, then the FSM circuit 205 transitions to state 307 to perform a loop count check. In state 307, the FSM circuit 205 compares the number of loops that FSM circuit 205 has executed to a maximum number of loops. The CAFU circuit 103 processes a different sequence of data sets in each of the loops. If the number of loops that the FSM circuit 205 has executed does not exceed the maximum number of loops, then the FSM circuit 205 returns to initialization state 302, and then back to state P01 303 to cause the processors 203-204 (P0-P1) to process data sets for another loop. If the number of loops that the FSM circuit 205 has executed exceeds the maximum number of loops, then the FSM circuit 205 transitions to the complete state 308. The FSM circuit 205 keeps track of the number of data sets and the number of loops processed by CAFU circuit 103 in order to determine the start address, the set address increment, and the loop address increment for cache storage of the data sets and patterns in the read and write requests generated by processors 203-204 (P0-P1) in the traffic transmitted to DCOH circuit 102.

The FSM circuit 205 can transition from states 302, 303, or 306 to the complete state 308 in response to the graceful disable function being set. The FSM 205 can also transition from any state to the complete state 308 in response to a forceful disable (FD) function being set. The FSM circuit 205 then transitions from the complete state 308 back to the idle state 301. The FSM circuit 205 can then begin the process described above again for processing additional data sets corresponding to additional loops.

Figure 4:
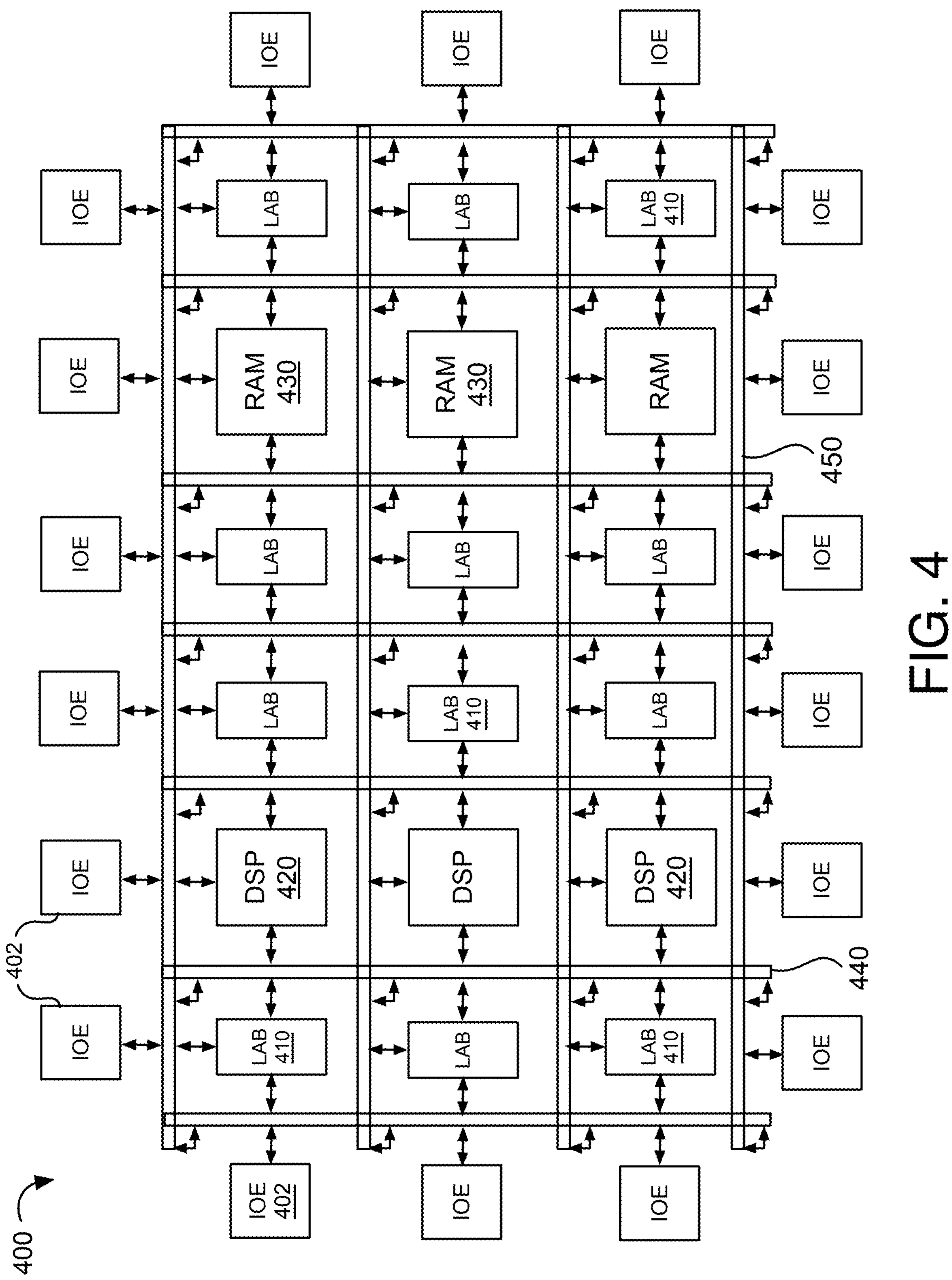
FIG. 4 is a diagram of an illustrative example of a configurable integrated circuit (IC).

FIG. 4 is a diagram of an illustrative example of a configurable integrated circuit (IC) 400. Configurable IC 400 is an example of an IC that can include the circuits and functions disclosed herein with respect to FIGS. 1-3. As shown in FIG. 4, the configurable integrated circuit 400 includes a two-dimensional array of configurable logic circuit blocks, including logic array blocks (LABs) 410 and other configurable logic circuit blocks, such as random access memory (RAM) blocks 430 and digital signal processing (DSP) blocks 420, for example. Configurable logic circuit blocks, such as LABs 410, can include smaller configurable regions (e.g., configurable logic elements, configurable logic blocks, or adaptive logic modules (ALMs)) that receive input signals and perform custom functions on the input signals to produce output signals.

The configurable integrated circuit 400 also includes programmable interconnect circuitry in the form of vertical routing channels 440 (i.e., interconnects formed along a vertical axis of configurable integrated circuit 400) and horizontal routing channels 450 (i.e., interconnects formed along a horizontal axis of configurable integrated circuit 400), each routing channel including at least one track to route at least one wire. One or more of the routing channels 440 and/or 450 can be part of a network-on-chip (NOC) having router circuits.

In addition, the configurable integrated circuit 400 has input/output elements (IOEs) 402 (e.g., including IO circuit blocks) for driving signals off of configurable integrated circuit 400 and for receiving signals from other devices. Input/output elements 402 can include parallel input/output circuitry, serial data transceiver circuitry, differential receiver and transmitter circuitry, or other circuitry used to connect one integrated circuit to another integrated circuit. Input/output elements 402 can include general purpose input/output (GPIO) circuitry (e.g., on the top and bottoms edges of IC 400), high-speed input/output (HSIO) circuitry (e.g., on the left edge of IC 400), and on-package input/output (OPIOs) circuitry (e.g., on the right edge of IC 400).

As shown, input/output elements 402 can be located around the periphery of the IC. If desired, the configurable integrated circuit 400 can have input/output elements 402 arranged in different ways. For example, input/output elements 402 can form one or more columns of input/output elements that can be located anywhere on the configurable integrated circuit 400 (e.g., distributed evenly across the width of the configurable integrated circuit). If desired, input/output elements 402 can form one or more rows of input/output elements (e.g., distributed across the height of the configurable integrated circuit). Alternatively, input/output elements 402 can form islands of input/output elements that can be distributed over the surface of the configurable integrated circuit 400 or clustered in selected areas.

Note that other routing topologies, besides the topology of the interconnect circuitry depicted in FIG. 4, can be used. For example, the routing topology can include wires that travel diagonally or that travel horizontally and vertically along different parts of their extent as well as wires that are perpendicular to the device plane in the case of three dimensional integrated circuits, and the driver of a wire can be located at a different point than one end of a wire. The routing topology can include global wires that span substantially all of configurable integrated circuit 400, fractional global wires such as wires that span part of configurable integrated circuit 400, staggered wires of a particular length, smaller local wires, or any other suitable interconnection resource arrangement.

Furthermore, it should be understood that examples disclosed herein may be implemented in any type of integrated circuit. If desired, the functional blocks of such an integrated circuit can be arranged in more levels or layers in which multiple functional blocks are interconnected to form still larger blocks. Other device arrangements can use functional blocks that are not arranged in rows and columns.

Configurable integrated circuit 400 can also contain programmable memory elements. The memory elements can be loaded with configuration data (also called programming data) using input/output elements (IOEs) 402. Once loaded, the memory elements each provide a corresponding static control signal that controls the operation of an associated functional block (e.g., LABs 410, DSP 420, RAM 430, or input/output elements 402).

In a typical scenario, the outputs of the loaded memory elements are applied to the gates of field-effect transistors in a functional block to turn certain transistors on or off and thereby configure the logic in the functional block including the routing paths. Programmable logic circuit elements that are controlled in this way include parts of multiplexers (e.g., multiplexers used for forming routing paths in interconnect circuits), look-up tables, logic arrays, AND, OR, NAND, and NOR logic gates, pass gates, etc.

The memory elements can use any suitable volatile and/or non-volatile memory structures such as random-access-memory (RAM) cells, fuses, antifuses, programmable read-only-memory memory cells, mask-programmed and laser-programmed structures, combinations of these structures, etc. Because the memory elements are loaded with configuration data during programming, the memory elements are sometimes referred to as configuration memory or programmable memory elements.

The programmable memory elements can be organized in a configuration memory array consisting of rows and columns. A data register that spans across all columns and an address register that spans across all rows can receive configuration data. The configuration data can be shifted onto the data register. When the appropriate address register is asserted, the data register writes the configuration data to the configuration memory elements of the row that was designated by the address register.

Configurable integrated circuit 400 can include configuration memory that is organized in sectors, whereby a sector can include the configuration bits that specify the function and/or interconnections of the subcomponents and wires in or crossing that sector. Each sector can include separate data and address registers.

The configurable IC 400 of FIG. 4 is merely one example of an IC that can be used with embodiments disclosed herein. The embodiments disclosed herein can be used with any suitable electronic integrated circuit or system. For example, the embodiments disclosed herein can be used with numerous types of electronic devices such as processor integrated circuits, central processing units, memory integrated circuits, graphics processing unit integrated circuits, application specific standard products (ASSPs), application specific integrated circuits (ASICs), and configurable logic integrated circuits. Examples of configurable logic integrated circuits include programmable arrays logic (PALs), programmable logic arrays (PLAs), field programmable logic arrays (FPLAs), electrically programmable logic devices (EPLDs), electrically erasable programmable logic devices (EEPLDs), logic cell arrays (LCAs), complex programmable logic devices (CPLDs), and field programmable gate arrays (FPGAs), just to name a few.

The integrated circuits disclosed in one or more embodiments herein can be part of a data processing system that includes one or more of the following components: a processor; memory; input/output circuitry; and peripheral devices. The data processing system can be used in a wide variety of applications, such as computer networking, data networking, instrumentation, video processing, digital signal processing, or any suitable other application. The integrated circuits can be used to perform a variety of different logic functions.

In general, software and data for performing any of the functions disclosed herein can be stored in non-transitory computer readable storage media. Non-transitory computer readable storage media is tangible computer readable storage media that stores data and software for access at a later time, as opposed to media that only transmits propagating electrical signals (e.g., wires). The software code may sometimes be referred to as software, data, program instructions, instructions, or code. The non-transitory computer readable storage media can, for example, include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Figures 5, 6:
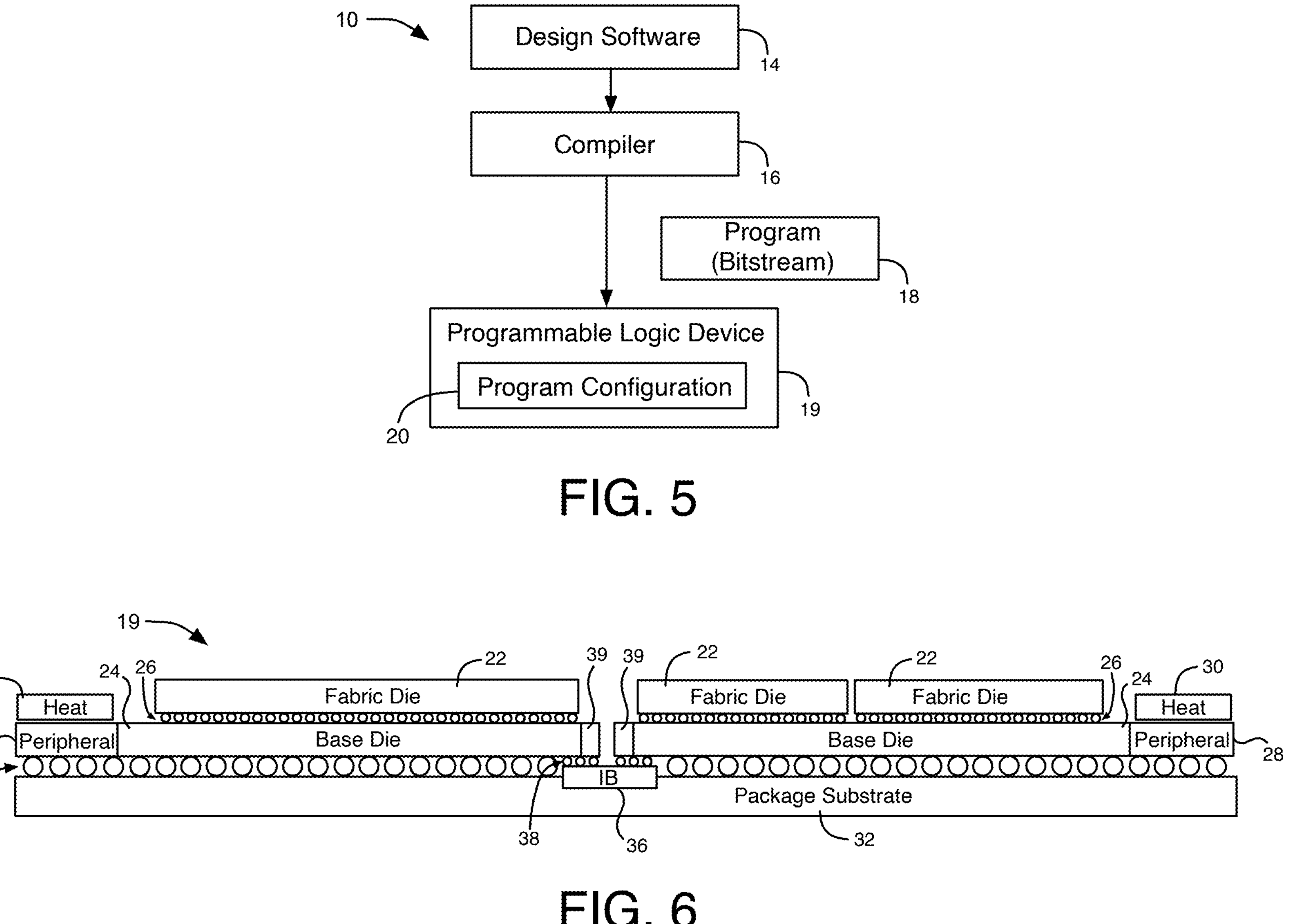
FIG. 5 illustrates a block diagram of a system that can be used to implement a circuit design to be programmed into a programmable logic device using design software.
FIG. 6 is a diagram that depicts an example of a programmable logic device that includes fabric dies and base dies that are connected to one another via microbumps.

FIG. 5 illustrates a block diagram of a system 10 that can be used to implement a circuit design to be programmed onto a programmable logic device 19 using design software. A designer can implement circuit design functionality on an integrated circuit, such as a reconfigurable programmable logic device 19 (e.g., a field programmable gate array (FPGA)). The designer can implement the circuit design to be programmed onto the programmable logic device 19 using design software 14. The design software 14 can use a compiler 16 to generate a low-level circuit-design program (bitstream) 18, sometimes known as a program object file and/or configuration program, that programs the programmable logic device 19. Thus, the compiler 16 can provide machine-readable instructions representative of the circuit design to the programmable logic device 19. For example, the programmable logic device 19 can receive one or more programs (bitstreams) 18 that describe the hardware implementations that should be stored in the programmable logic device 19. A program (bitstream) 18 can be programmed into the programmable logic device 19 as a configuration program 20. The configuration program 20 can, in some cases, represent an accelerator function to perform for machine learning, video processing, voice recognition, image recognition, or other highly specialized task.

In some implementations, a programmable logic device can be any integrated circuit device that includes a programmable logic device with two separate integrated circuit die where at least some of the programmable logic fabric is separated from at least some of the fabric support circuitry that operates the programmable logic fabric. One example of such a programmable logic device is shown in FIG. 6, but many others can be used, and it should be understood that this disclosure is intended to encompass any suitable programmable logic device where programmable logic fabric and fabric support circuitry are at least partially separated on different integrated circuit die.

FIG. 6 is a diagram that depicts an example of the programmable logic device 19 that includes three fabric die 22 and two base die 24 that are connected to one another via microbumps 26. In the example of FIG. 6, at least some of the programmable logic fabric of the programmable logic device 19 is in the three fabric die 22, and at least some of the fabric support circuitry that operates the programmable logic fabric is in the two base die 24. For example, some of the circuitry of configurable IC 400 shown in FIG. 4 (e.g., LABs 410, DSP 420, and RAM 430) can be located in the fabric die 22 and some of the circuitry of IC 400 (e.g., input/output elements 402) can be located in the base die 24.

Although the fabric die 22 and base die 24 appear in a one-to-one relationship or a two-to-one relationship in FIG. 6, other relationships can be used. For example, a single base die 24 can attach to several fabric die 22, or several base die 24 can attach to a single fabric die 22, or several base die 24 can attach to several fabric die 22 (e.g., in an interleaved pattern). Peripheral circuitry 28 can be attached to, embedded within, and/or disposed on top of the base die 24, and heat spreaders 30 can be used to reduce an accumulation of heat on the programmable logic device 19. The heat spreaders 30 can appear above, as pictured, and/or below the package (e.g., as a double-sided heat sink). The base die 24 can attach to a package substrate 32 via conductive bumps 34. In the example of FIG. 6, two pairs of fabric die 22 and base die 24 are shown communicatively connected to one another via an interconnect bridge 36 (e.g., an embedded multi-die interconnect bridge (EMIB)) and microbumps 38 at bridge interfaces 39 in base die 24.

In combination, the fabric die 22 and the base die 24 can operate in combination as a programmable logic device 19 such as a field programmable gate array (FPGA). It should be understood that an FPGA can, for example, represent the type of circuitry, and/or a logical arrangement, of a programmable logic device when both the fabric die 22 and the base die 24 operate in combination. Moreover, an FPGA is discussed herein for the purposes of this example, though it should be understood that any suitable type of programmable logic device can be used.

Figure 7:
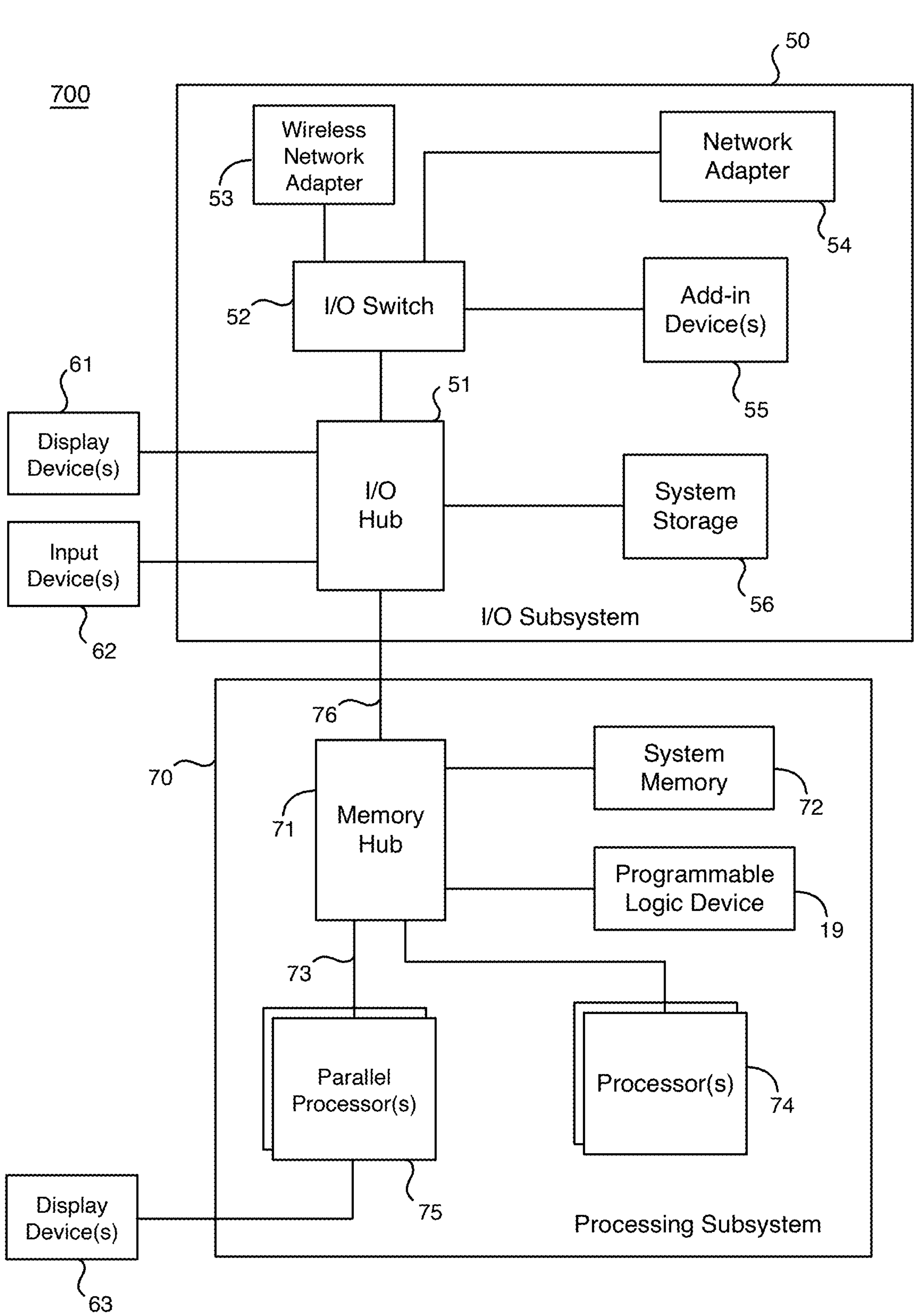
FIG. 7 is a block diagram illustrating a computing system configured to implement one or more aspects of the embodiments described herein.

FIG. 7 is a block diagram illustrating a computing system 700 configured to implement one or more aspects of the embodiments described herein. The computing system 700 includes a processing subsystem 70 having one or more processor(s) 74, a system memory 72, and a programmable logic device 19 communicating via an interconnection path that can include a memory hub 71. The memory hub 71 can be a separate component within a chipset component or can be integrated within the one or more processor(s) 74. The memory hub 71 couples with an input/output (I/O) subsystem 50 via a communication link 76. The I/O subsystem 50 includes an input/output (I/O) hub 51 that can enable the computing system 700 to receive input from one or more input device(s) 62. Additionally, the I/O hub 51 can enable a display controller, which can be included in the one or more processor(s) 74, to provide outputs to one or more display device(s) 61. In one embodiment, the one or more display device(s) 61 coupled with the I/O hub 51 can include a local, internal, or embedded display device.

In one embodiment, the processing subsystem 70 includes one or more parallel processor(s) 75 coupled to memory hub 71 via a bus or other communication link 73. The communication link 73 can use one of any number of standards based communication link technologies or protocols, such as, but not limited to, PCI Express, or can be a vendor specific communications interface or communications fabric. In one embodiment, the one or more parallel processor(s) 75 form a computationally focused parallel or vector processing system that can include a large number of processing cores and/or processing clusters, such as a many integrated core (MIC) processor. In one embodiment, the one or more parallel processor(s) 75 form a graphics processing subsystem that can output pixels to one of the one or more display device(s) 61 coupled via the I/O Hub 51. The one or more parallel processor(s) 75 can also include a display controller and display interface (not shown) to enable a direct connection to one or more display device(s) 63.

Within the I/O subsystem 50, a system storage unit 56 can connect to the I/O hub 51 to provide a storage mechanism for the computing system 700. An I/O switch 52 can be used to provide an interface mechanism to enable connections between the I/O hub 51 and other components, such as a network adapter 54 and/or a wireless network adapter 53 that can be integrated into the platform, and various other devices that can be added via one or more add-in device(s) 55. The network adapter 54 can be an Ethernet adapter or another wired network adapter. The wireless network adapter 53 can include one or more of a Wi-Fi, Bluetooth, near field communication (NFC), or other network device that includes one or more wireless radios.

The computing system 700 can include other components not shown in FIG. 7, including other port connections, optical storage drives, video capture devices, and the like, that can also be connected to the I/O hub 51. Communication paths interconnecting the various components in FIG. 7 can be implemented using any suitable protocols, such as PCI (Peripheral Component Interconnect) based protocols (e.g., PCI-Express), or any other bus or point-to-point communication interfaces and/or protocol(s), such as the NV-Link high-speed interconnect, or interconnect protocols known in the art.

In one embodiment, the one or more parallel processor(s) 75 incorporate circuitry optimized for graphics and video processing, including, for example, video output circuitry, and constitutes a graphics processing unit (GPU). In another embodiment, the one or more parallel processor(s) 75 incorporate circuitry optimized for general purpose processing, while preserving the underlying computational architecture. In yet another embodiment, components of the computing system 700 can be integrated with one or more other system elements on a single integrated circuit. For example, the one or more parallel processor(s) 75, memory hub 71, processor(s) 74, and I/O hub 51 can be integrated into a system on chip (SoC) integrated circuit. Alternatively, the components of the computing system 700 can be integrated into a single package to form a system in package (SIP) configuration. In one embodiment, at least a portion of the components of the computing system 700 can be integrated into a multi-chip module (MCM), which can be interconnected with other multi-chip modules into a modular computing system.

The computing system 700 shown herein is illustrative. Other variations and modifications are also possible. The connection topology, including the number and arrangement of bridges, the number of processor(s) 74, and the number of parallel processor(s) 75, can be modified as desired. For instance, in some embodiments, system memory 72 is connected to the processor(s) 74 directly rather than through a bridge, while other devices communicate with system memory 72 via the memory hub 71 and the processor(s) 74. In other alternative topologies, the parallel processor(s) 75 are connected to the I/O hub 51 or directly to one of the one or more processor(s) 74, rather than to the memory hub 71. In other embodiments, the I/O hub 51 and memory hub 71 can be integrated into a single chip. Some embodiments can include two or more sets of processor(s) 74 attached via multiple sockets, which can couple with two or more instances of the parallel processor(s) 75.

Some of the particular components shown herein are optional and may not be included in all implementations of the computing system 700. For example, any number of add-in cards or peripherals can be supported, or some components can be eliminated. Furthermore, some architectures can use different terminology for components similar to those illustrated in FIG. 7. For example, the memory hub 71 can be referred to as a Northbridge in some architectures, while the I/O hub 51 can be referred to as a Southbridge.

Additional examples are now described. Example 1 is an integrated circuit comprising: a device coherency circuit; first and second traffic generator processor circuits; first and second interfaces; and a processor control finite state machine circuit that causes the first traffic generator processor circuit to perform first coherency data validation for first data sets and that causes the second traffic generator processor circuit to perform second coherency data validation for second data sets, wherein the first traffic generator processor circuit transmits first traffic for the first data sets to the device coherency circuit through the first interface, and wherein the second traffic generator processor circuit transmits second traffic for the second data sets to the device coherency circuit through the second interface.

In Example 2, the integrated circuit of Example 1 may optionally include, wherein the processor control finite state machine circuit causes the first and the second traffic generator processor circuits to perform the first and the second coherency data validations for the first data sets and the second data sets asynchronously.

In Example 3, the integrated circuit of any one of Examples 1-2 may optionally include, wherein the first traffic generator processor circuit generates first read requests and first write requests in the first traffic, and wherein the second traffic generator processor circuit generates second read requests and second write requests in the second traffic.

In Example 4, the integrated circuit of any one of Examples 1-3 may optionally include, wherein the processor control finite state machine circuit compares a number of the first data sets and the second data sets that the first and the second traffic generator processor circuits have processed to a set count threshold to determine whether to continue processing within a loop of the processor control finite state machine circuit.

In Example 5, the integrated circuit of any one of Examples 1-4 may optionally include, wherein the processor control finite state machine circuit compares a number of loops executed by the processor control finite state machine circuit to a maximum number of the loops to determine when to end processing of the first and the second data sets by the first and the second traffic generator processor circuits.

In Example 6, the integrated circuit of any one of Examples 1-5 may optionally include, wherein the first traffic generator processor circuit, the second traffic generator processor circuit, and the processor control finite state machine circuit are part of a coherent acceleration functional unit that implements functions being offloaded and accelerated on an accelerator in the integrated circuit by transmitting the first and the second traffic to the device coherency circuit.

In Example 7, the integrated circuit of any one of Examples 1-6 may optionally include, wherein the first interface comprises a first first-in-first out circuit for storing the first traffic, and wherein the second interface comprises a second first-in-first out circuit for storing the second traffic.

In Example 8, the integrated circuit of any one of Examples 1-7 may optionally include, wherein the first traffic generator processor circuit transmits the first traffic to the device coherency circuit through the first interface asynchronously with the second traffic generator processor circuit transmitting the second traffic to the device coherency circuit through the second interface.

In Example 9, the integrated circuit of any one of Examples 1-8 further comprises a third interface that transmits the first and the second traffic from the device coherency circuit to an external device.

Example 10 is a method for processing first and second data sets in a coherent acceleration functional unit, the method comprising: enabling a first traffic generator processor circuit to perform first coherency data validation for the first data sets using a finite state machine circuit; enabling a second traffic generator processor circuit to perform second coherency data validation for the second data sets using the finite state machine circuit; transmitting first data coherency traffic for the first data sets from the first traffic generator processor circuit to a device coherency circuit through a first interface; and transmitting second data coherency traffic for the second data sets from a second traffic generator processor circuit to the device coherency circuit through the second interface.

In Example 11, the method of Example 10 further comprises performing the first coherency data validation for the first data sets using the first traffic generator processor circuit asynchronously with the second traffic generator processor circuit performing the second coherency data validation for the second data sets in response to control signals from the finite state machine circuit.

In Example 12, the method of any one of Examples 10-11 may optionally include, wherein transmitting the first data coherency traffic for the first data sets comprises transmitting first read requests and first write requests through the first interface, and wherein transmitting the second data coherency traffic for the second data sets comprises transmitting second read requests and second write requests through the second interface.

In Example 13, the method of any one of Examples 10-12 further comprises comparing a number of the first data sets and the second data sets that the first and the second traffic generator processor circuits have processed to a set count threshold to determine whether to continue processing within a loop of the finite state machine circuit.

In Example 14, the method of any one of Examples 10-13 further comprises comparing a number of loops executed by the finite state machine circuit to a maximum number of the loops to determine when to end processing of the first and the second data sets by the first and the second traffic generator processor circuits.

In Example 15, the method of any one of Examples 10-14 may optionally include, wherein transmitting the first data coherency traffic from the first traffic generator processor circuit to the device coherency circuit through the first interface is performed asynchronously with transmitting the second data coherency traffic from the second traffic generator processor circuit to the device coherency circuit through the second interface in response to control signals from the finite state machine circuit.

Example 16 is a coherent acceleration functional unit circuit comprising: a finite state machine circuit; a first processor circuit that performs first coherency data validation for first data sets in response to first control signals from the finite state machine circuit; and a second processor circuit that performs second coherency data validation for second data sets in response to second control signals from the finite state machine circuit, wherein the first processor circuit exchanges first data coherency traffic for the first data sets with a device coherency circuit through a first interface in response to the first control signals from the finite state machine circuit; and wherein the second processor circuit exchanges second data coherency traffic for the second data sets with the device coherency circuit through a second interface in response to the second control signals from the finite state machine circuit.

In Example 17, the coherent acceleration functional unit circuit of Example 16 may optionally include, wherein the finite state machine circuit causes the first and the second processor circuits to perform the first and the second coherency data validations for the first data sets and the second data sets asynchronously.

In Example 18, the coherent acceleration functional unit circuit of any one of Examples 16-17 may optionally include, wherein the finite state machine circuit compares a number of the first data sets and the second data sets that the first and the second processor circuits have processed by performing the first and the second coherency data validations to a set count threshold to determine whether to continue processing within a loop of the finite state machine circuit.

In Example 19, the coherent acceleration functional unit circuit of any one of Examples 16-18 may optionally include, wherein the finite state machine circuit compares a number of loops executed by the finite state machine circuit to a maximum number of the loops to determine when to end processing of the first and the second data sets by the first and the second processor circuits.

In Example 20, the coherent acceleration functional unit circuit of any one of Examples 16-19 may optionally include, wherein the first processor circuit transmits first read requests and first write requests for the first data sets to the device coherency circuit through the first interface in response to the first control signals, and wherein the second processor circuit transmits second read requests and second write requests for the second data sets to the device coherency circuit through the second interface in response to the second control signals.

The foregoing description of the exemplary embodiments has been presented for the purpose of illustration. The foregoing description is not intended to be exhaustive or to be limiting to the examples disclosed herein. The foregoing is merely illustrative of the principles of this disclosure and various modifications can be made by those skilled in the art. The foregoing embodiments may be implemented individually or in any combination.

What is claimed is:

1. An integrated circuit comprising:

a device coherency circuit;

first and second traffic generator processor circuits;

first and second interfaces; and a processor control finite state machine circuit that causes the first traffic generator processor circuit to perform first coherency data validation for first data sets and that causes the second traffic generator processor circuit to perform second coherency data validation for second data sets, wherein the first traffic generator processor circuit transmits first traffic for the first data sets to the device coherency circuit through the first interface, and wherein the second traffic generator processor circuit transmits second traffic for the second data sets to the device coherency circuit through the second interface.

2. The integrated circuit of claim 1, wherein the processor control finite state machine circuit causes the first and the second traffic generator processor circuits to perform the first and the second coherency data validations for the first data sets and the second data sets asynchronously.

3. The integrated circuit of claim 1, wherein the first traffic generator processor circuit generates first read requests and first write requests in the first traffic, and wherein the second traffic generator processor circuit generates second read requests and second write requests in the second traffic.

4. The integrated circuit of claim 1, wherein the processor control finite state machine circuit compares a number of the first data sets and the second data sets that the first and the second traffic generator processor circuits have processed to a set count threshold to determine whether to continue processing within a loop of the processor control finite state machine circuit.

5. The integrated circuit of claim 1, wherein the processor control finite state machine circuit compares a number of loops executed by the processor control finite state machine circuit to a maximum number of the loops to determine when to end processing of the first and the second data sets by the first and the second traffic generator processor circuits.

6. The integrated circuit of claim 1, wherein the first traffic generator processor circuit, the second traffic generator processor circuit, and the processor control finite state machine circuit are part of a coherent acceleration functional unit that implements functions being offloaded and accelerated on an accelerator in the integrated circuit by transmitting the first traffic and the second traffic to the device coherency circuit.

7. The integrated circuit of claim 1, wherein the first interface comprises a first first-in-first-out circuit for storing the first traffic, and wherein the second interface comprises a second first-in-first-out circuit for storing the second traffic.

8. The integrated circuit of claim 1, wherein the first traffic generator processor circuit transmits the first traffic to the device coherency circuit through the first interface asynchronously with the second traffic generator processor circuit transmitting the second traffic to the device coherency circuit through the second interface.

9. The integrated circuit of claim 1 further comprising:

a third interface that transmits the first traffic and the second traffic from the device coherency circuit to an external device.

10. A method for processing first and second data sets in a coherent acceleration functional unit, the method comprising:

enabling a first traffic generator processor circuit to perform first coherency data validation for the first data sets using a finite state machine circuit;

enabling a second traffic generator processor circuit to perform second coherency data validation for the second data sets using the finite state machine circuit;

transmitting first data coherency traffic for the first data sets from the first traffic generator processor circuit to a device coherency circuit through a first interface; and transmitting second data coherency traffic for the second data sets from the second traffic generator processor circuit to the device coherency circuit through a second interface.

11. The method of claim 10 further comprising:

performing the first coherency data validation for the first data sets using the first traffic generator processor circuit asynchronously with the second traffic generator processor circuit performing the second coherency data validation for the second data sets in response to control signals from the finite state machine circuit.

12. The method of claim 10, wherein transmitting the first data coherency traffic for the first data sets comprises transmitting first read requests and first write requests through the first interface, and wherein transmitting the second data coherency traffic for the second data sets comprises transmitting second read requests and second write requests through the second interface.

13. The method of claim 10 further comprising:

comparing a number of the first data sets and the second data sets that the first and the second traffic generator processor circuits have processed to a set count threshold to determine whether to continue processing within a loop of the finite state machine circuit.

14. The method of claim 10 further comprising:

comparing a number of loops executed by the finite state machine circuit to a maximum number of the loops to determine when to end processing of the first and the second data sets by the first and the second traffic generator processor circuits.

15. The method of claim 10, wherein transmitting the first data coherency traffic from the first traffic generator processor circuit to the device coherency circuit through the first interface is performed asynchronously with transmitting the second data coherency traffic from the second traffic generator processor circuit to the device coherency circuit through the second interface in response to control signals from the finite state machine circuit.

16. A coherent acceleration functional unit circuit comprising:

a finite state machine circuit;

a first processor circuit that performs first coherency data validation for first data sets in response to first control signals from the finite state machine circuit; and a second processor circuit that performs second coherency data validation for second data sets in response to second control signals from the finite state machine circuit, wherein the first processor circuit exchanges first data coherency traffic for the first data sets with a device coherency circuit through a first interface in response to the first control signals from the finite state machine circuit; and wherein the second processor circuit exchanges second data coherency traffic for the second data sets with the device coherency circuit through a second interface in response to the second control signals from the finite state machine circuit.

17. The coherent acceleration functional unit circuit of claim 16, wherein the finite state machine circuit causes the first and the second processor circuits to perform the first and the second coherency data validations for the first data sets and the second data sets asynchronously.

18. The coherent acceleration functional unit circuit of claim 16, wherein the finite state machine circuit compares a number of the first data sets and the second data sets that the first and the second processor circuits have processed by performing the first and the second coherency data validations to a set count threshold to determine whether to continue processing within a loop of the finite state machine circuit.

19. The coherent acceleration functional unit circuit of claim 16, wherein the finite state machine circuit compares a number of loops executed by the finite state machine circuit to a maximum number of the loops to determine when to end processing of the first and the second data sets by the first and the second processor circuits.

20. The coherent acceleration functional unit circuit of claim 16, wherein the first processor circuit transmits first read requests and first write requests for the first data sets to the device coherency circuit through the first interface in response to the first control signals, and wherein the second processor circuit transmits second read requests and second write requests for the second data sets to the device coherency circuit through the second interface in response to the second control signals.

* * * * *